United States Patent [19]

Komura

[11] Patent Number: 4,974,907

[45] Date of Patent: Dec. 4, 1990

[54] PNEUMATIC CUTTER FOR CONCRETE AND THE LIKE

[75] Inventor: Katsunori Komura, Hiroshima, Japan

[73] Assignees: Kabushiki Kaisha Koumu, Hiroshima; Fuji Kuuki Kabushiki Kaisha, Osaka, both of Japan

[21] Appl. No.: 384,529

[22] Filed: Jul. 25, 1989

[30] Foreign Application Priority Data

Jul. 26, 1988 [JP] Japan .................................. 63-187265

[51] Int. Cl.⁵ ...................... E01C 23/09; E21C 35/22
[52] U.S. Cl. ........................................ 299/39; 30/390; 83/100
[58] Field of Search ............... 299/39, 18, 81; 30/390; 83/100, 478, 574; 144/252 R; 125/36

[56] References Cited

U.S. PATENT DOCUMENTS

| | | | |
|---|---|---|---|
| 3,572,841 | 1/1969 | Rhodes | 299/39 |
| 3,882,598 | 5/1975 | Earle et al. | 30/390 |
| 4,063,478 | 12/1977 | Stuy | 83/100 |
| 4,241,505 | 12/1980 | Bodycomb, Jr. et al. | 83/100 X |
| 4,253,362 | 3/1981 | Olson | 83/100 |
| 4,255,995 | 3/1981 | Connor | 144/252 R |
| 4,414,743 | 11/1983 | Pioch et al. | 83/100 X |
| 4,516,807 | 5/1985 | Eagles | 299/81 X |

Primary Examiner—Stephen J. Novosad
Attorney, Agent, or Firm—Armstrong, Nikaido, Marmelstein, Kubovcik & Murray

[57] ABSTRACT

This invention discloses a pneumatic cutter for concrete and the like in which: a suction pipe is provided on a circular arc-shaped case covering the upper half of a disk cutter member driven by air motor incorporated in a body, and a venturi section and an exhaust cylinder are provided in connection to the suction pipe in a row; a valve and a branched pipe are provided in connection to an air hose coupling cylinder in order, and in which a larger pipe of the branched pipe is connected to the air motor while a smaller pipe is connected to the venturi section; and an exhaust port of the air motor is provided on the body, and an exhaust nozzle which is provided on a surface where the circular arc-shaped case faces to the disk cutter member and the exhaust nozzle are connected to each other through a communicating passage.

3 Claims, 2 Drawing Sheets

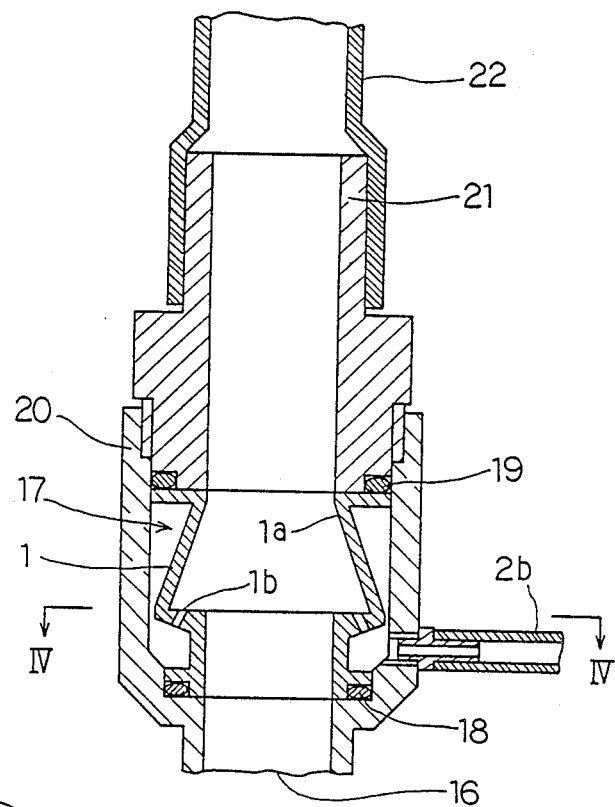
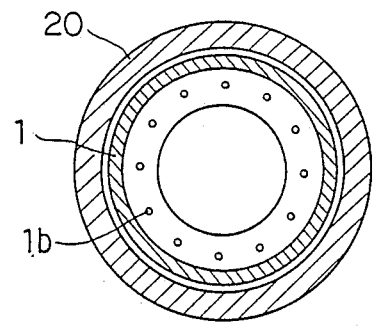

PNEUMATIC CUTTER FOR CONCRETE AND THE LIKE

BACKGROUND OF THE INVENTION

This invention relates to a pneumatic cutter which is used for destruction or cutting of concrete and the like.

Concrete or like material have been hitherto destroyed or cut with a disk cutter which is driven by an air motor.

When cutting or destroying concrete or the like with a conventional disc cutter driven by an air motor, a problem exists in that dust or swarf inevitably produced by cutting is scattered and accumulated on the surrounding environment, and the portion to be cut is often out of sight under the accumulated dust. Such dust or swarf is not good for a person's health. Moreover, there exists another promblem of overheating the disk cutter resulting in the shortening of the life of the cutter.

Accordingly, this invention intends to prevent scattering of dust produced by cutting, thereby improving the working environment, lengthening the life of the disk cutter and improving working efficiency as a whole.

Other objects of the invention will become apparent in the course of the description of the embodiment later-described.

BRIEF SUMMARY OF THE INVENTION

In the pneumatic cutter for concrete or the like according to the invention includes:

a suction pipe which is provided on a circular arc-shaped case covering an upper half of a disk cutter member driven by air motor incorporated in a body, and a venturi section and an exhaust cylinder are provided for connecting with the suction pipe in a row;

a valve and a branch pipe which are provided for connecting with an air hose coupling cylinder in order, and wherein a larger pipe of the branched pipe is connected to the air motor while the smaller pipe is connected to the venturi section; and an exhaust port of the air motor which is provided on the body, and an exhaust nozzle which is provided on a surface where the circular arc-shaped case faces the disk cutter member and the exhaust nozzle are connected to each other through a communicating passage.

The pneumatic cutter of above construction exhibits the following function.

When opening the valve, the air motor is driven by the air supplied b y way of the larger pipe, then the venturi section is put into a state of negative pressure due to the air supplied by way of the smaller pipe and blowing out toward outlet, whereby dust produced by cutting is taken in through the suction pipe and sent to the exhaust cylinder. In this step, the air used for driving the air motor is so as to be applied to the disk cutter member and blown out, whereby heat generated in the disk cutter member is cooled resulting in the prevention of the disk cutter member from overheating. In this respect, because the presure in the circular arc-shaped case increases due to the air blown out of the exhaust port, sucton of the aforesaid venturi section is further accelerated and improved.

BRIEF DESCRIPTION OF THE DRAWINGS

FIG. 3 is a vertical sectional front view of the venturi section; and

FIG. 4 is a sectional view taken along the line IV—IV.

DESCRIPTION OF THE PREFERRED EMBODIMENT

Figure 1:
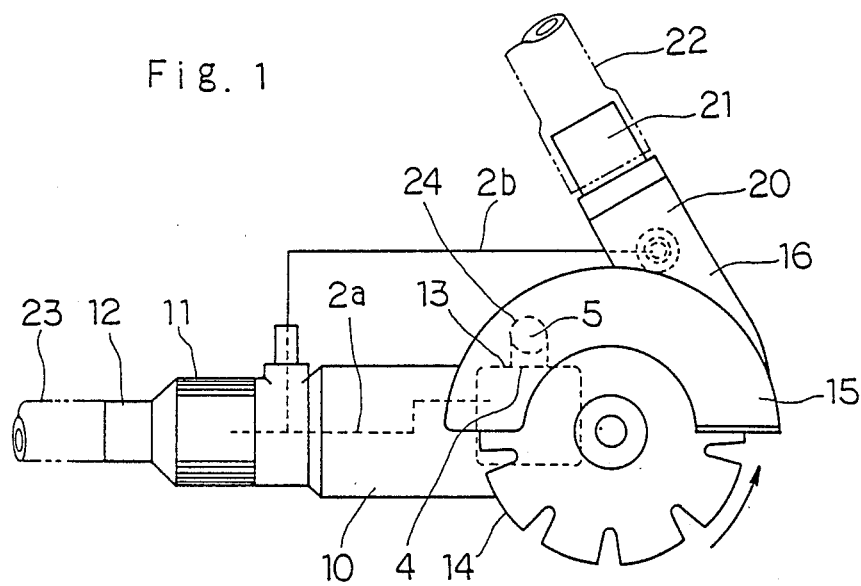
FIG. 1 is a side view illustrating an embodiment of this invention.

An embodiment of this invention is now described hereinafter. Referring to FIG. 1, reference numeral 10 indicates the body, numeral 13 indicates the air motor, numeral 14 indicates the disk cutter member driven by the air motor, and numeral 15 indicates the circular arc-shaped case covering an upper half of the disk cutter member 14.

Referring to FIG. 3, numeral 16 indicates the suction pipe provided on the circular arc-shaped case 15, numeral 1 indicates the venturi member, numeral 1a indicates the throttle portion of the venturi member 1, numeral 1b indicates the compressed air exhaust ports provided at a lower end of the throttle portion 1a, and numeral 17 generally indicates the venturi section. In this respect, as illustrated in FIG. 4, a plurality of compressed air exhaust ports 1b are formed in the circumferential direction of the venturi member 1 with equal distances between one and the other. These compressed air exhaust ports 1b are opened in such a manner as to incline inwardly with respect to the exhaust side forming a cone shape. Numerals 18 and 19 indicate O-rings disposed at opposite ends of the venturi member 1. Numeral 20 indicates the outer cylinder disposed on the outside of the venturi member 1, and numeral 21 indicates the exhaust cylinder.

Figure 2:
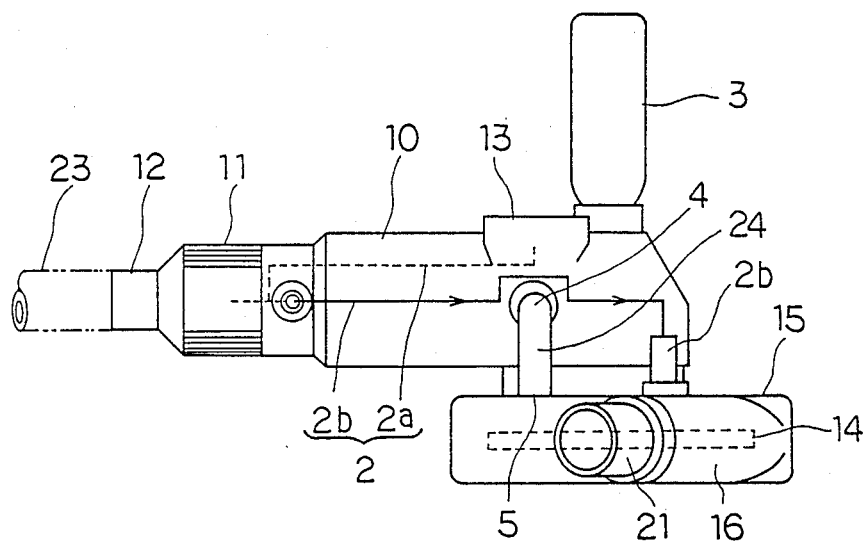
FIG. 2 is a plan view thereof.

Referring to FIG. 2, numeral 2 indicates the branched pipe provided in connection to the valve 11, and in which a larger pipe 2a is connected to the air motor 13 while smaller pipe 2b is connected to the outer cylinder 20 of the venturi section 17. It is preferable that the ratio of sectional area between the larger pipe 2a land the smaller pipe 2b is approximately 3:1. Numeral 11 indicates the valve attached to the body 10 to switch the inflow of the air. The switching is performed by turning the valve 11. Numeral 12 indicates the air hose coupling cylinder provided in connection to the valve 11.

Further, as illustrated in FIG. 1, the exhaust port 4 for the air motor 13 is provided on the upper part of the body 10. The exhaust nozzle 5 provided on the surface where the circular arc-shaped case 15 faces the disk cutter member 14 and the aforesaid exhaust port 4 are connected to each other through the communicating passage 24. In addition, a flexible pipe 22 is coupled to the exhaust cylinder 21.

Operation of the pneumatic cutter of the foregoing embodiment is now described hereinbelow. First, for starting the operation, the valve 11 is opened to pass compressed air through the branched pipe 2 comprising the larger pipe 2a and the smaller pipe 2b. The air motor 13 is driven by the compressed air supplied from the larger pipe 2a and transmits a driving force to the disk cutter member 14, thereby rotating the disk cutter member 14 at high speed. The air from the air motor 13 is forcibly blown into the case 15 by way of exhaust port 4, communicating passage 24 and the exhaust port 5, as illustrated in FIG. 2, thus heat generated in the disk cutter member 14 is cooled and prevented from overheating.

The compressed air supplied from the smaller pipe 2b then flows into the outer cylinder 20 and is blown into the venturi section 17 through the compressed air exhaust ports 1b as illustrated in FIG. 3. In the venturi section 17, a negative pressure or vacuum is generated as a result of the jet of the compressed air which is blown out of the exhaust ports 1b to the exhaust side with inward inclination and of increasing flow rate. Then, dust produced by cutting and accumulated in the case 15 is forcibly drawn into the venturi section 17 by the suction pipe 16. The produced dust drawn into the venturi section 17 is then exhausted out of the exhaust cylinder 21 through the flexible pipe 22.

In this manner, a suction flow for absorbing the compressed air is generated in the suction pipe 16, and the produced dust is drawn out together with this flow of the compressed air.

In this operation, because pressure in the circular arc-shaped case 15 is higher than outside due to the air being forcibly supplied from the exhaust port 5, suction by the venturi section 17 is further accelerated and improved, thereby resulting in effective prevention from scattering of the produced dust.

Since the throttle portion 1a is formed on the venturi section 17 and the compressed air exhaust ports 1b are formed in such a manner as to be inclined inwardly with respect to the exhaust side in the foregoing embodiment, negative pressure or vacuum is sufficiently generated in the venturi section 17, which also results in powerful suction of the produced dust into the case 15.

In this invention, as a result of the construction described above, dust produced by cutting is forcibly sucked into the exhaust cylinder due to the negative pressure generated in the venturi section by the jet of the compressed air. Accordingly, the pneumatic cutter of the invention is effectively prevented from scattering and accumulation of the produced dust, thereby improving the working environment. Further, since the disk cutter member is cooled at all times by the air passing from the exhaust port to the exhaust cylinder through the case, the disk cutter member is effectively prevented from burning due to overheating. As a result, working efficiency as a whole is significantly improved. Furthermore, since pressure in the circular arc-shaped case increases due to the air blown out of the exhaust port, suction by the venturi section is all the more accelerated and thereby, further contributing to the prevention from the scattering of dust.

While the invention has been particularly shown and described in reference to preferred embodiments thereof, it will be understood by those skilled in the art that changes in form and details may be made therein without departing from the spirit and scope of the invention.

What is claimed is:

1. A pneumatic cutter for concrete and the like, comprising:
    a suction pipe coupled to a circular arc-shaped case covering an upper half of a disk cutter member driven by an air motor incorporated in a body of the pneumatic cutter, the suction pipe having a venturi section and an exhaust cylinder in connecton to the suction pipe;
    a valve on said body in connection to an air hose coupling cylinder; and
    a branched pipe connected to said valve and including a larger pipe and a smaller pipe, the larger pipe of the branched pipe being connected to the air motor, the smaller pipe being connected to the venturi section.

2. A pneumatic cutter for concrete and the like according to claim 1, wherein the ratio of sectional areas between the larger pipe and the smaller pipe is approximately 3:1.

3. A pneumatic cutter for concrete and the like according to claim 1, wherein a plurality of exhaust ports are provided at the venturi section.

* * * * *